March 15, 1966    G. V. CONRY    3,239,950
SHORTHAND TEACHING AID AND METHOD OF MAKING
Filed June 28, 1962

INVENTOR
Gladys V. Conry

BY Mason, Fenwick & Lawrence
ATTORNEYS

United States Patent Office 3,239,950
Patented Mar. 15, 1966

3,239,950
SHORTHAND TEACHING AID AND METHOD
OF MAKING
Gladys V. Conry, 1300 Seaton Lane, Virginia Forest,
Falls Church, Va.
Filed June 28, 1962, Ser. No. 206,037
6 Claims. (Cl. 35—35)

This invention relates generally to a teaching aid and a method for making and using the aid. More particularly, the present invention relates to a novel method and means whereby a teacher is able to have complete flexibility and control in the presentation of shorthand dictation material.

A number of methods and means are presently available for teaching shorthand and presenting shorthand dictation material. Invariably, however, each of these well-known systems are found lacking in some desirable aspect such as flexibility or control. By flexibility is meant the desirability of presenting shorthand dictation material at widely varying speeds and more particularly, speeds that differ from one another by small increments of perhaps five words per minte. By control is meant the requirement that the teacher in presenting the shorthand dictation material can do so accurately at a predetermined speed.

Among the methods found to be unsatisfactory are those in which indicia are presented along with the wording at representative time intervals which may be fifteen seconds. In use, this system provides control but does not permit variation in any speed without the possibility of confusing the teacher.

Another system similar to the first is frequently used to present shorthand dictation material at a specific speed and includes the grouping of every two lines within a recitation time of ten seconds. According to the length of the line and the word intensity depended the speed of the reading. Again, there was no flexibility of small incremental increase or decrease in speed.

Other methods presently in use permit a partial control with very limited flexibility through the use of an accompanying table with dictation material marked at approximately twenty word groups. The twenty word groups can be recited within various times to permit the necessary desired speed. However, the speed variation is limited and therefore the flexibility is limited to large incremental increases or decreases which are not satisfactory.

Without a complete flexibility in the speed of presenting shorthand dictation material, the teacher is not able to recite material to the pupil at small increments, thereby guiding the pupil along gradually. Because such gradual increases are not possible in the available methods, many students fail to meet the requirements for becoming stenographers. If material were available for each and every increase desired, the amount of reading material would, of course, be very substantial. In order to avoid any great amount of dictation material, it is common to comprise and present dictation material at incremental speeds of twenty words per minute.

It is the principal object of the present invention to provide a teaching aid for presenting shorthand dictation material which permits the teacher to have the necessary control over the speed and also to permit various small incremental increases in the speed of the recitation to the pupil.

It is another important object of the present invention to provide a system for presenting shorthand dictation material which does not require a change in the basic reading material and which is adaptable to any rate of speed.

This invention also has as an object the accommodation of any syllable intensity.

Another object of this invention is the adaptability for starting the dictation at any line.

Other objects and advantages of the present invention will become apparent to those skilled in the art, from the following description when read in conjunction with the accompanying drawing, wherein:

FIGURE 1 shows an underlay or regulator means broken down into uniformly sized and arranged areas.

FIGURE 2 is a showing of dictation material provided on the sheet according to the number of syllables in each word the sheet being shown as if superposed on the regulator of FIGURE 1.

FIGURE 3 is a showing of an overlay means provided with the time interval means thereon which, when placed on the sheet in FIGURE 2, provides the novel dictation material.

Briefly, the present invention incorporates the formation of the dictation material onto a sheet such that each syllable of each word is represented by a specific aligned area on the sheet and the use of an overlay having interval indicia thereon corresponding to a certain time period in which the words placed within the areas on the sheet are to be recited.

This invention is based upon the use of syllable intensity theory of dictation as distinguished from a simple word intensity. Since words vary considerably in the number of syllables, it is considerably more accurate to use as a common denominator in preparing material for shorthand dictation the average number of syllables per word in determining the number of words to be used for dictation in a unit time. For instance, it is recognized that for the average business material that the average number of syllables per word is 1.4. Therefore, for dictation at eighty words per minute there actually would be 112 syllables recited per minute. While in technical subject matter the average number of syllables may be greater, the standard of 1.4 syllables per word will be used. It must be understood, however, that the present invention is adaptable to any syllable intensity.

In FIGURE 1 is shown the regulator means 10 which is used to formulate the syllable areas or boxes shown as 12. These areas 12 are all of equal size and are aligned laterally, as clearly shown, and also longitudinally. While it is possible to successfully construct the regulator means without the longitudinal alignment with the boxes, nevertheless, whatever arrangement is made it must be uniform. For convenience and practicality, the lateral and longitudinal alignment will be the only arrangement referred to. Each one of the areas 12 is numbered consecutively, as shown. However, again, this is a matter of convenience and it is not necessary to number any of the areas. The sheet 18 can be of any material of a relatively permanent nature and the only requirement is that the lines 14 and 16, which form the boundaries of the areas, be clearly visible from the background of the regulator 10. It has been found desirable that the lines 14 and 16 are best formed in a black color on a white background.

FIGURE 2 shows the conventional sheet 18 on which is shown, in phantom, lines 14 and 16 of the regulator 10. The sheet 18 is preferably made of thin translucent material such as the ordinary letter paper which, when superposed on the regulator 10, will permit the lines 14 and 16 of the regulator 10 to show through. Accordingly, lines 14 and 16 are shown in FIGURE 2. When the regulator and the sheet are in position, one under the other, it is then possible to inscribe the words within the areas 12 such that each area represents a single syllable. In the event that a word has two or more syllables, the word is written to extend into as many areas as is possible and practical without abnormally stretching the extent of the word. Whether the syllable is actually written into or inscribed on the area representing the syllable is not important but rather only the requirement that the number of areas representing the word are equal to the number of syllables in the word. The areas 12 are arbitrarily chosen to be of a width equal to about five letters for every syllable. In the event that a syllable has more than five letters, it is permissible that the syllable extend beyond its designated area and the following syllables be placed in the areas while compensating for the previous syllables which extended beyond its allotted area. As shown in FIGURE 2, the word "unfortunately" has five syllables and could not be written to extend five areas without distorting the continuity of the word. Thus, the first and fifth areas representing the first and fifth syllables of the word "unfortunately" remain blank.

The method of inscribing the words on the sheet 18, spaced according to the number of syllables, can be by hand or by conventional typewriter. It is also within the purview of this invention to include a printed sheet wherein each syllable of every word is printed according to the requirement that each syllable be represented by a separate and distinct space or area.

When completed, the sheet 18 is composed of the dictation material properly arranged laterally and longitudinally such that there are the same number of syllables in every laterally aligned group of areas. For convenience, the number of spaces or areas is shown in FIGURES 1 and 2 to be 10. However, it is to be understood that any number of laterally aligned areas may be used as long as the number is uniform longitudinally.

In FIGURE 3 is shown the overlay means 20 which must be of a transparent type of material such as plastic or glass, and the like, through which the wording imposed on a sheet 18 can be read. As shown, the overlay or sheet 20 includes interval means in the form of indicia 22 which are placed at predetermined locations on the overlay in order that a certain number of syllables may be recited within a predetermined period of time represented by the interval means. For instance, when a speed of 80 words per minute is desired the uppermost indicia in the form of a single dot on an overlay similar to overlay 20 would represent a time interval of fifteen seconds and when such overlay is placed on sheet 18 the single dot would mark the 28th area or, in other words, the 28th syllable, again assuming a syllable intensity of 1.4. The next indicia which is two dots would denote the 56th syllable or area. Thus, in the half-minute denoted by the two-dot indicia, 56 syllables shall have been recited, etc., etc. In FIGURE 2 the locations of the interval indicia 22 on overlay 20, when superimposed on sheet 18 are shown for twenty-five words per minute. It can been seen that at the 9th, 18th, 26th and 35th spaces successively, indicia of fifteen seconds through one minute are located to indicate to the teacher the elapse of the time period.

Thus, it can be seen that depending upon the interval means incorporated into the overlay 20 depends the speed at which the teacher would recite the reading material. A different overlay is to be used for each speed thus forming a series of sheets 20. However, it is to be understood that it is possible to use different colored indicia on the overlay to indicate intervals corresponding to two or three different speeds. Attempts to incorporate a greater number of intervals on the overlay corresponding to a number of different speeds would result in confusion of the teacher and, therefore, it is suggested that the intervals denoted on the overlay be kept to a minimum.

For convenience the overlay 20 can be easily constructed by using the regulator 10 and making the indicia in the form of dots, for instance, or any other interval designation by placing the overlay 20 on the regulator 10 and making the indicia mark for the interval corresponding to the groups of areas which will give the desired ultimate word speed per minute. For instance, it was stated in fifteen seconds if nine syllables are recited, it would approximate twenty-five words per minute at a syllable intensity of 1.4. Eleven, twelve, fourteen, sixteen and eighteen syllables recited within fifteen seconds, would correspond to a word speed of thirty, thirty-five, forty, forty-five and fifty words per minute, respectively. It is possible that the interval means in the form of indicia on overlay 20 may be made erasable such as with a crayon or the like which is removable from a suitable plastic surface and any time the speed is desired to be increased five words per minute a new set of indicia could be added corresponding to the desired word speed or it is, of course, possible to have separate sets of permanently marked overlays.

It can be seen from the foregoing description of the invention that a number of methods may be used to construct the sheet, having the words spaced according to the number of syllables. It is important, however, that once the shorthand dictation material is properly arranged within the predetermined areas on the sheet that this same sheet with the same arrangement of wording can be used for any speed of recitation merely by the use of a separate overlay. The invention, therefore, considerably reduces the amount of material necessary to be maintained by the teacher since it is only different overlays that need be retained along with the wording spaced according to syllable content. The invention is not limited to either a specific number of areas laterally aligned or vertically aligned although 10 laterally and 25 longitudinally have been found to be effective.

It is probable that the present invention would put into use rates of speed ranging from 25 to 400 words per minute in increments of 5 words resulting in: 25, 30, 35, et cetera, all using the same specially spaced dictation material. The sheet 18 would probably cover three or four succesive pages. Correspondingly, there would be three or four successive pages of the overlay 20. Students at the secondary level would be using speeds from 25 to 140 words per minute, representing 24 different rates. With three pages to each set of these 24 speeds, the teacher would have 72 pages of the overlay 20. Obviously, some precaution should be taken to assure that she does not inadvertently use the wrong overlays as for instance: 80 words per minute for the first page; 85 for the second and 90 for the third. The use of transparent overlays in a recurring pattern of four contrasting colors should suffice: clear for 80; yellow for 85; green for 90; pink for 95; clear for 100; et cetera.

A further advantage of the present invention is the possibility of starting the dictation at any line. For example an article might not be completed in the first session. To finish the dictation, it is necessary to start at a line other than the first. By positioning the partially completed sheet 18 and the successive sheet 18 end to end while maintaining the spacing between the adjoining lines of both sheets uniform with the spacing between all of the lines, the overlay 20 of the first page of the set can be placed over both the sheets 18, so as to begin with the indicia for the first 15-second interval. In like manner, sheets 18 of pages 2 and 3 can be positioned for use of the overlay 20 of the second page thereof. Thus, the timing is as exact and easy as if the dictation started with the first line.

From the foregoing detailed description, it will be evident that there are a number of changes, adaptations, and modifications of the present invention which come within the province of those skilled in the art. However, it is intended that all such variations not departing from the spirit of the invention, be considered as within the scope thereof as limited solely by the appended claims.

I claim:

1. A teaching aid adapted to permit a teacher to recite predetermined words at any predetermined speed including a first sheet having a plurality of predetermined areas, said areas being positioned on said first sheet to form a plurality of laterally extending lines of connected areas, each said area being of equal lateral extent, said lines being longitudinally disposed on said first sheet, words produced on said first sheet, said words being distributed within said areas such that each laterally extending line contains a sufficient number of groups of words which differ from groups of words in other lines such that the total number of syllables contained by said groups of words on each said line approximately equals the total number of areas forming each said line, a second sheet placed against said first sheet, time interval indicating means on said second sheet indicating equal periods of time, each said interval indicating means being spaced on said second sheet to encompass a predetermined equal number of syllables on said first sheet to enable the teacher to recite at any predetermined number of words for unit time.

2. The teaching aid of claim 1 wherein second sheet is a light transmitting overlay.

3. The teaching aid of claim 1 wherein said second sheet is one of a series of second sheets, each second sheet having time interval indicating means thereon spaced such that a different number of syllables are encompassed thereby relative to other sheets in said series, whereby the teacher is enabled to recite a different number of words per unit time corresponding to each particular sheet in said series.

4. The teaching aid of claim 3 wherein said time interval indicating means are indicia on said sheets.

5. The teaching aid of claim 1 including a series of different second sheets corresponding to different recitation speeds, each said second sheet being provided with said interval indicating means, said interval indicating means including indicia thereon, the indicia on said different second sheets being uniformly spaced to encompass between adjacent indicia on the same sheet equal numbers of syllables on said first sheet, said number of syllables so encompassed being different compared to different sheets in said series, whereby selection of any of said different second sheets by a teacher enables said teacher to recite a number of words per unit time corresponding to the number of syllables encompassed by said indicia.

6. The teaching aid of claim 5 wherein the second sheets are light transmitting overlays.

References Cited by the Examiner
UNITED STATES PATENTS

| | | | |
|---|---|---|---|
| 477,087 | 6/1892 | Viser | 283—45 |
| 2,360,328 | 10/1944 | Bell | 283—45 |
| 2,883,767 | 4/1959 | Bell et al. | 35—35.5 |

EUGENE R. CAPOZIO, *Primary Examiner.*

LEO SMILOW, LAWRENCE CHARLES, JEROME SCHNALL, *Examiners.*